US012658591B2

(12) United States Patent
Hashimoto

(10) Patent No.: US 12,658,591 B2
(45) Date of Patent: Jun. 16, 2026

(54) ELECTRONIC APPARATUS

(71) Applicant: Innolux Corporation, Miaoli County (TW)

(72) Inventor: Kazuyuki Hashimoto, Miaoli County (TW)

(73) Assignee: Innolux Corporation, Miaoli County (TW)

( * ) Notice: Subject to any disclaimer, the term of this patent is extended or adjusted under 35 U.S.C. 154(b) by 216 days.

(21) Appl. No.: 18/341,768

(22) Filed: Jun. 27, 2023

(65) Prior Publication Data

US 2024/0178571 A1 May 30, 2024

Related U.S. Application Data

(60) Provisional application No. 63/427,846, filed on Nov. 24, 2022.

(51) Int. Cl.

| | |
|---|---|
| ***H01Q 13/10*** | (2006.01) |
| ***H01Q 3/24*** | (2006.01) |
| ***H01Q 23/00*** | (2006.01) |

(52) U.S. Cl.
CPC .......... *H01Q 13/103* (2013.01); *H01Q 3/242* (2013.01); *H01Q 23/00* (2013.01)

(58) Field of Classification Search
CPC ...... H01Q 13/103; H01Q 3/242; H01Q 23/00; H01Q 3/2682; H01Q 21/0012
See application file for complete search history.

(56) References Cited

U.S. PATENT DOCUMENTS

| | | | | |
|---|---|---|---|---|
| 11,468,817 B1 * | 10/2022 | Kim | ..................... | G09G 3/2074 |
| 2001/0017566 A1 * | 8/2001 | Nakahara | ................ | H02M 3/07 327/536 |
| 2010/0034339 A1 * | 2/2010 | Iwai | ...................... | G11C 19/28 377/76 |

* cited by examiner

*Primary Examiner* — Lincoln D Donovan
*Assistant Examiner* — Amit R Bhatia
(74) *Attorney, Agent, or Firm* — JCIPRNET

(57) ABSTRACT

An electronic apparatus is provided. The electronic apparatus includes a plurality of sets of cascaded units. Each one of the plurality of sets of cascaded units is electrically connected to a common data line and a common clock signal line. Each one of the plurality of sets of cascaded units forms a cascaded circuit.

18 Claims, 15 Drawing Sheets

ELECTRONIC APPARATUS

CROSS-REFERENCE TO RELATED APPLICATION

This application claims the priority benefit of U.S. provisional application Ser. No. 63/427,846, filed on Nov. 24, 2022. The entirety of the above-mentioned patent application is hereby incorporated by reference herein and made a part of this specification.

BACKGROUND

Technical Field

The disclosure relates an apparatus, particularly, the disclosure relates to an electronic apparatus.

Description of Related Art

With the development of communication technology, the directional antenna has more and more applications and demands. However, how to optimize the module design and layout design of the directional antenna is an important topic in this field.

SUMMARY

The electronic apparatus of the disclosure includes a plurality of sets of cascaded units. Each one of the plurality of sets of cascaded units is electrically connected to a common data line and a common clock signal line. Each one of the plurality of sets of cascaded units forms a cascaded circuit.

Based on the above, the electronic apparatus may implement a driving scheme without scan lines.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
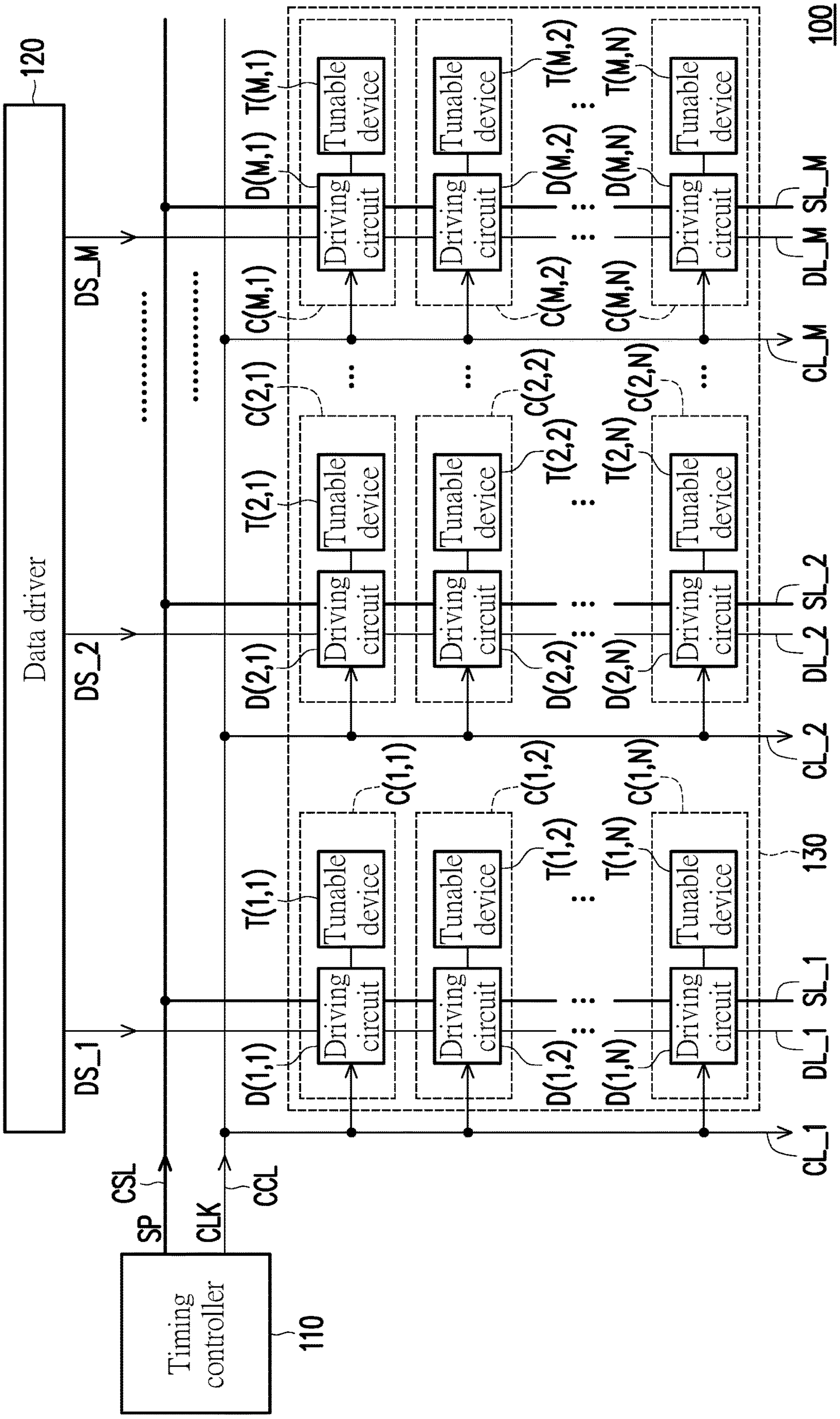
FIG. 1 is a schematic diagram of an electronic apparatus according to an embodiment of the disclosure.

Reference will now be made in detail to the exemplary embodiments of the disclosure, examples of which are illustrated in the accompanying drawings. Whenever possible, the same reference numbers are used in the drawings and the description to refer to the same or like components.

Certain terms are used throughout the specification and appended claims of the disclosure to refer to specific components. Those skilled in the art should understand that electronic apparatus manufacturers may refer to the same components by different names. This article does not intend to distinguish those components with the same function but different names. In the following description and rights request, the words such as “comprise” and “include” are open-ended terms, and should be explained as “including but not limited to . . . ”.

The term “electrically connect” used throughout the whole specification of the present application (including the appended claims) may refer to any direct or indirect connection means. For example, if the text describes that a first device is electrically connected to a second device, it should be interpreted that the first device may be directly connected to the second device, or the first device may be indirectly connected through other devices or certain connection means to be connected to the second device. The terms “first”, “second”, and similar terms mentioned throughout the whole specification of the present application (including the appended claims) are merely used to name discrete elements or to differentiate among different embodiments or ranges. Therefore, the terms should not be regarded as limiting an upper limit or a lower limit of the quantity of the elements and should not be used to limit the arrangement sequence of elements. In addition, wherever possible, elements/components/steps using the same reference numerals in the drawings and the embodiments represent the same or similar parts. Reference may be mutually made to related descriptions of elements/components/steps using the same reference numerals or using the same terms in different embodiments.

The electronic apparatus of the disclosure may be an antenna module, such as a beam-steerable directional antenna with a radial line slot antenna (RLSA) architecture. The cascaded unit of the disclosure may correspond to an antenna unit. The cascaded unit of the disclosure may include a driving circuit and a tunable device, and the tunable device of the disclosure may be a voltage-controlled device, and the voltage-controlled device may include, for example, a varactor, a resistor, an inductor or a capacitor. The tunable device may be driven by the driving circuit according to a data voltage. If the cascaded unit is the antenna unit, the tunable device may be configured to determine an antenna radiation field type and/or a radiation frequency according to the data voltage.

It should be noted that in the following embodiments, the technical features of several different embodiments may be replaced, recombined, and mixed without departing from the spirit of the disclosure to complete other embodiments. As long as the features of each embodiment do not violate the spirit of the disclosure or conflict with each other, they may be mixed and used together arbitrarily.

FIG. 1 is a schematic diagram of an electronic apparatus according to an embodiment of the disclosure. Referring to FIG. 1, the electronic apparatus 100 includes a timing controller (TCON) 110, a data driver 120 and a cascaded module 130. The cascaded module 130 includes a plurality of sets of cascaded units C(1,1) to C(M,N), where M and N are positive integers. The timing controller 110 is electrically connected to the sets of cascaded units C(1,1) to C(M,N) through a common start pulse signal line CSL and a common clock signal line CCL, and is configured to provide a start pulse signal SP and a clock signal CLK through the common start pulse signal line CSL and the common clock signal line CCL. Each set of the cascaded units C(1,1) to C(M,N) is electrically connected to the common start pulse signal line CSL through the same branch signal line (i.e. the start pulse signal lines SL_1 to SL_M), and is electrically connected to the common clock signal line CCL through another same branch signal line (i.e. the clock signal lines CL_1 to CL_M). The data driver 120 is electrically connected to the sets of cascaded units C(1,1) to C(M,N) through a plurality of common data lines DL_1 to DL_M, and is configured to provide a plurality of data signal DS_1 to DS_M. The each set of the cascaded units C(1,1) to C(M,N) is electrically connected to the same common data line.

In the embodiment of the disclosure, the cascaded units C(1,1) to C(M,N) includes a plurality of driving circuits D(1,1) to D(M,N) and a plurality of tunable devices T(1,1) to T(M,N) and, the driving circuits D(1,1) to D(M,N) is configured to drive the tunable devices T(1,1) to T(M,N). Each cascaded unit includes one driving circuit and one tunable device, but the disclosure is not limited thereto. In the embodiment of the disclosure, each one of the driving circuits D(1,1) to D(M,N) is configured to receive the start pulse signal SP and the clock signal CLK through the common start pulse signal line CSL and the common clock signal line CCL, and is configured to receive the corresponding data signal through the corresponding common data line. Each one of the driving circuits D(1,1) to D(M,N) is further configured to output a control signal to the corresponding tunable device according to the start pulse signal SP, the clock signal CLK and the corresponding data signal. In the embodiment of the disclosure, the cascaded units of each set of cascaded units C(1,1) to C(M,N) form a cascaded circuit.

Figure 2:
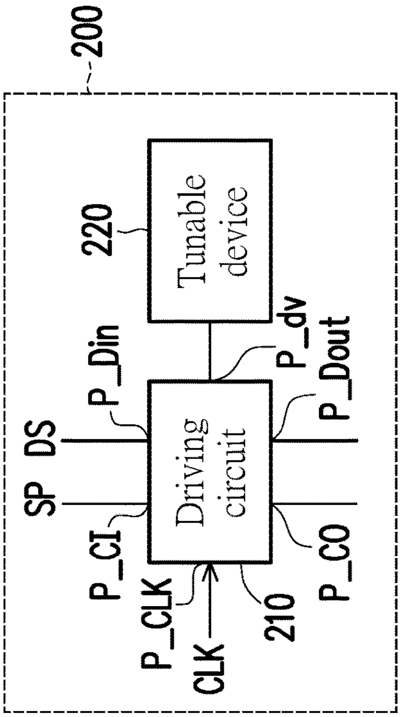
FIG. 2 is a schematic diagram of a cascaded unit according to the embodiment of FIG. 1 of the disclosure.

FIG. 2 is a schematic diagram of a cascaded unit according to the embodiment of FIG. 1 of the disclosure. Referring to FIG. 2, each one of the cascaded units C(1,1) to C(M,N) of FIG. 1 may be implemented in the same way as the cascaded unit 200 of FIG. 2. In the embodiment of the disclosure, the cascaded unit 200 includes a driving circuit 210 and a tunable device 220. The tunable device 220 is electrically connected to the driving circuit 210, and driven by the driving circuit 210. The driving circuit 210 may be a discrete integrated circuit or a thin film transistor circuit, but the disclosure is not limited thereto. In the embodiment of the disclosure, the driving circuit 210 may include a carry-in terminal P_CI, a carry-out terminal P_CO, a clock control terminal P_CLK, a data input terminal P_Din, a data output terminal P_Dout and a driving terminal P_dv.

The clock control terminal P_CLK of the driving circuit 210 is electrically connected to the common clock signal line to receive the clock signal CLK. If the cascaded unit 200 is a first stage, the carry-in terminal P_CI of the driving circuit 210 is electrically connected to the common start pulse signal line to receive the start pulse signal SP, and the carry-out terminal P_CO of the driving circuit 210 is electrically connected to the carry-in terminal of the cascaded unit of the next stage to output the start pulse signal SP (i.e. a cascade output signal for use in the next stage as a cascade input signal). If the cascaded unit 200 is not the first stage, the carry-in terminal P_CI of the driving circuit 210 is electrically connected to the carry-out terminal of the cascaded unit of the previous stage to receive the start pulse signal SP (i.e. the cascade input signal, and taken from the cascade output signal of the previous stage), and the carry-out terminal P_CO of the driving circuit 210 is electrically connected to the carry-in terminal of the cascaded unit of the next stage to output the start pulse signal SP (i.e. another cascade output signal for use in the next stage as the cascade input signal).

If the cascaded unit 200 is the first stage, the data input terminal P_Din of the driving circuit 210 is electrically connected to the common data line to receive the data signal DS, and the data output terminal P_Dout of the driving circuit 210 is electrically connected to the data input terminal of the driving circuit of the next stage to output the data signal DS. If the cascaded unit 200 is not the first stage, the data input terminal P_Din of the driving circuit 210 is electrically connected to the data output terminal of the driving circuit of the pervious stage to receive the data signal DS, and the data output terminal P_Dout of the driving circuit 210 is electrically connected to the data input terminal of the driving circuit of the next stage to output the data signal DS.

The driving terminal P_dv of the driving circuit 210 is electrically connected to the tunable device 220, and is configured to output a control signal to the tunable device 220 according to the clock signal CLK, the start pulse signal SP and the data signal DS, so as to drive the tunable device 220 by the control signal.

Figure 3A:
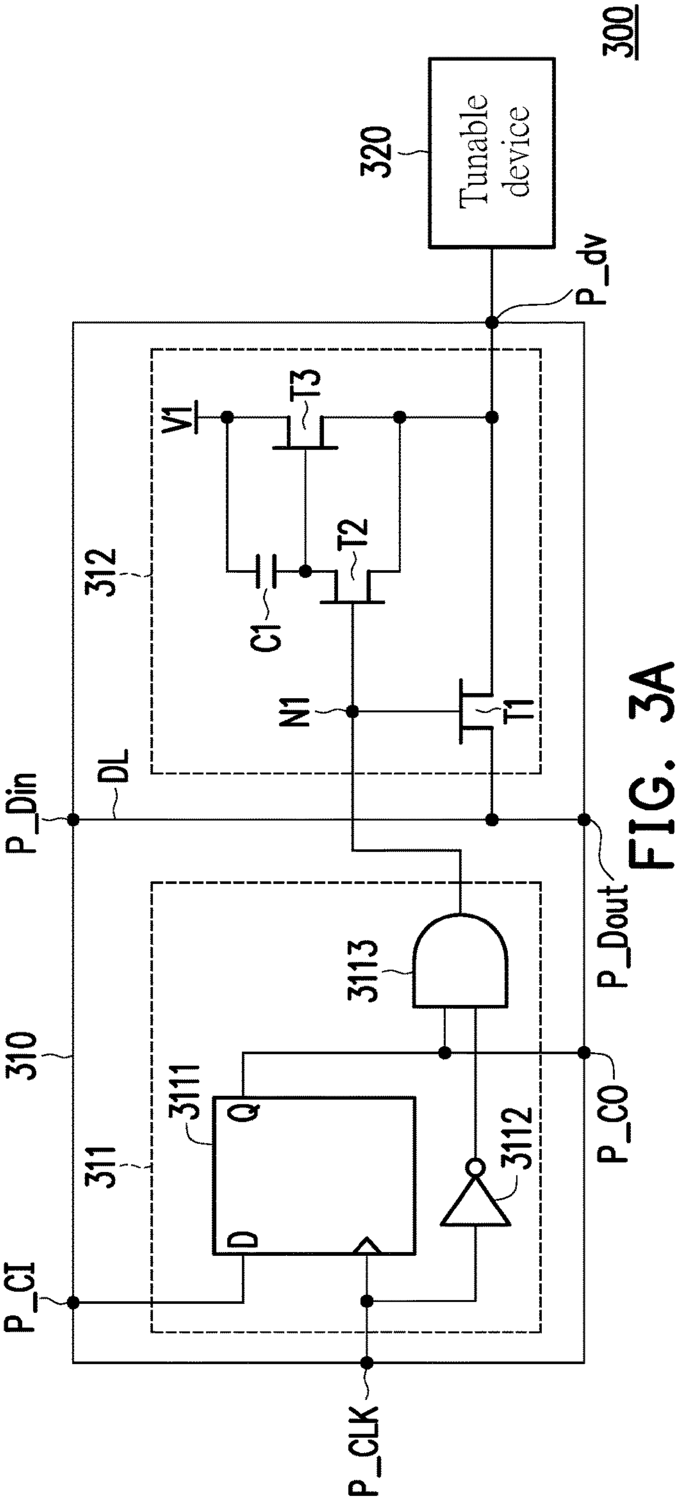
FIG. 3A is a schematic diagram of a cascaded unit according to an embodiment of the disclosure.

FIG. 3A is a schematic diagram of a cascaded unit according to an embodiment of the disclosure. Referring to FIG. 3A, the specific circuit architecture of the cascaded unit 200 may be implemented in the same way as the cascaded unit 300 of FIG. 3A. In the embodiment of the disclosure, the cascaded unit 300 includes a driving circuit 310 and a tunable device 320. The driving circuit 310 includes a scan driver 311 and a bias circuit 312. The scan driver 311 is configured to output a scan signal to the bias circuit 312. The scan driver 311 includes a flip-flop circuit 3111 (e.g. D-type flip-flop), an inverter circuit 3112 and an AND gate 3113. A data input terminal (D) of the flip-flop circuit 3111 is configured to receive a cascade input signal (i.e. the start pulse signal form pervious stage) through the carry-in terminal P_CI. A clock control terminal of the flip-flop circuit 3111 is configured to receive the clock signal through the clock control terminal P_CLK. An input terminal of the inverter circuit 3112 is configured to receive the clock signal through the clock control terminal P_CLK. A first input terminal of the AND gate 3113 is electrically connected to a data output terminal (Q) of the flip-flop circuit 3111. The data output terminal (Q) of the flip-flop circuit 3111 may output a cascade output signal (i.e. the start pulse signal for next stage) through the carry-out terminal P_CO. A second terminal of the AND gate 3113 is electrically connected to an output terminal of the inverter circuit 3112. An output terminal of the AND gate 3113 is configured to output the scan signal to a circuit node N1 in the bias circuit 312.

The bias circuit 312 includes a plurality of transistors T1 to T3 and a capacitor CI. A first terminal of the transistor T1 is electrically connected to the common data line DL. The common data line DL is configured to transmit the data signal from the data input terminal P_Din to the data output terminal P_Dout. A control terminal of the transistor T1 is electrically connected to the circuit node N1 to receive the scan signal. A second terminal of the transistor T1 is electrically connected to the driving terminal P_dv to output the control signal to the tunable device 320 according to the data signal when the transistor T1 is turned-on by the scan signal. A first terminal of the capacitor C1 is electrically connected to an operation voltage V1. A second terminal of the capacitor C1 is electrically connected to a first terminal of the transistor T2 and a control terminal of the transistor T3. The capacitor C1 is configured to hold a data voltage transmitted from the transistor T1 and the transistor T2, corresponding to the control signal. The first terminal of the transistor T2 is further electrically connected to the control terminal of the transistor T3. A control terminal of the transistor T2 is electrically connected to the circuit node N1 to receive the scan signal. A second terminal of the transistor T2 is electrically connected to the second terminal of the transistor T1 and the driving terminal P_dv. A first terminal of the transistor T3 is electrically connected to the operation voltage V1. A second terminal of the transistor T3 is electrically connected to the second terminal of the transistor T2, the second terminal of the transistor T1 and the driving terminal P_dv to output the control signal, corresponding to the data voltage held by the capacitor C1 when the transistor T1 is turned-off by the scan signal. In the embodiment of the disclosure, the transistors T1 to T3 may be N-type transistors, but the disclosure is not limited thereto.

In the embodiment of the disclosure, the transistors T1 to T3 and the capacitor C1 may constitute a constant voltage source circuit. The constant voltage source circuit may include a source follower amplifier constituted by the transistor T2, transistor T3 and the capacitor C1. Moreover, the constant voltage source circuit may provide a voltage that can be efficiently restored (refreshed) through data scanning to compensate for the voltage drop caused by the leakage current of the varactor of the tunable device 320.

In addition, in one embodiment of the disclosure, the driving circuit 310 may further include a voltage amplifier disposed on the common data line DL, so as to enhance the data signal transmitted to the next stage.

Figure 3B:
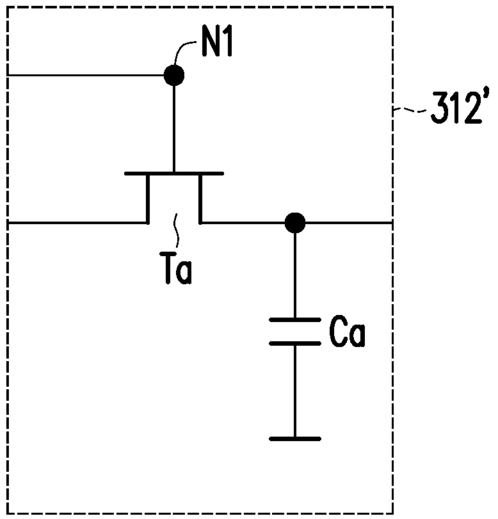
FIG. 3B is a schematic diagram of a bias circuit according to another embodiment of the disclosure.

FIG. 3B is a schematic diagram of a bias circuit according to another embodiment of the disclosure. Referring to FIGS. 3A and 3B, in one embodiment of the disclosure, the bias circuit 312 of FIG. 3A may also be replaced with the bias circuit 312' of FIG. 3B. The bias circuit 312' includes a transistor Ta and a capacitor Ca. A first terminal of the transistor Ta is electrically connected to the common data line DL. A control terminal of the transistor Ta is electrically connected to the circuit node N1 to receive the scan signal. A second terminal of the transistor Ta is electrically connected to a first terminal of the capacitor Ca and the driving terminal P_dv. A second terminal of the capacitor Ca is electrically connected to a constant voltage (e.g. a ground voltage). The capacitor Ca is configured to hold the data voltage transmitted from the transistor Ta, and outputs the data voltage to the driving terminal P_dv as the control signal when the transistor Ta is turned-off by the scan signal. In the embodiment of the disclosure, the transistor Ta and the capacitor Ca may constitute a constant voltage source circuit. In the embodiment of the disclosure, the transistor Ta may be a N-type transistor, but the disclosure is not limited thereto.

Figure 3C:
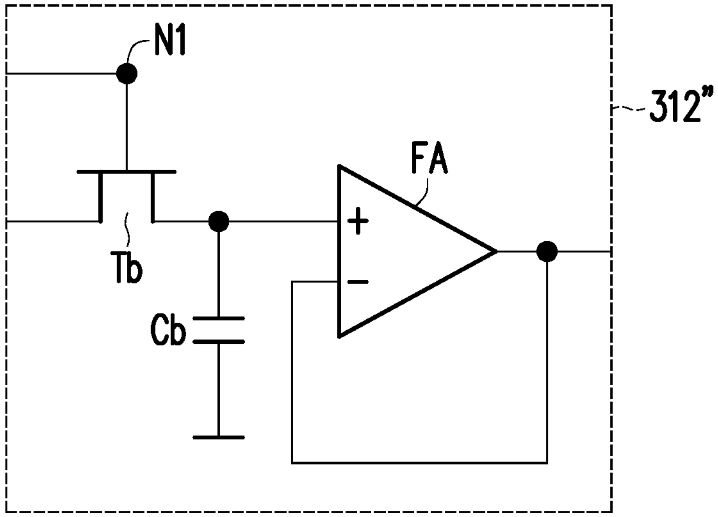
FIG. 3C is a schematic diagram of a bias circuit according to another embodiment of the disclosure.

FIG. 3C is a schematic diagram of a bias circuit according to another embodiment of the disclosure. Referring to FIGS. 3A and 3C, in one embodiment of the disclosure, the bias circuit 312 of FIG. 3A may also be replaced with the bias circuit 312" of FIG. 3C. The bias circuit 312" includes a transistor Tb, a capacitor Cb and an operational amplifier FA. A first terminal of the transistor Tb is electrically connected to the common data line DL. A control terminal of the transistor Tb is electrically connected to the circuit node N1 to receive the scan signal. A second terminal of the transistor Tb is electrically connected to a first terminal of the capacitor Cb and a positive input terminal of the operational amplifier FA. A second terminal of the capacitor Cb is electrically connected to a constant voltage (e.g. a ground voltage). The capacitor Cb is configured to hold the data voltage transmitted from the transistor Tb. A negative input terminal of the operational amplifier FA is electrically connected to an output terminal of the operational amplifier FA. The output terminal of the operational amplifier FA is electrically connected to the driving terminal P_dv, and outputs the control signal, corresponding to the data voltage held by the capacitor Cb. In the embodiment of the disclosure, the transistor Tb, the capacitor Cb and the operational amplifier FA may constitute a constant voltage source circuit. In the embodiment of the disclosure, the transistor Tb may be a N-type transistor, but the disclosure is not limited thereto.

Figure 4:
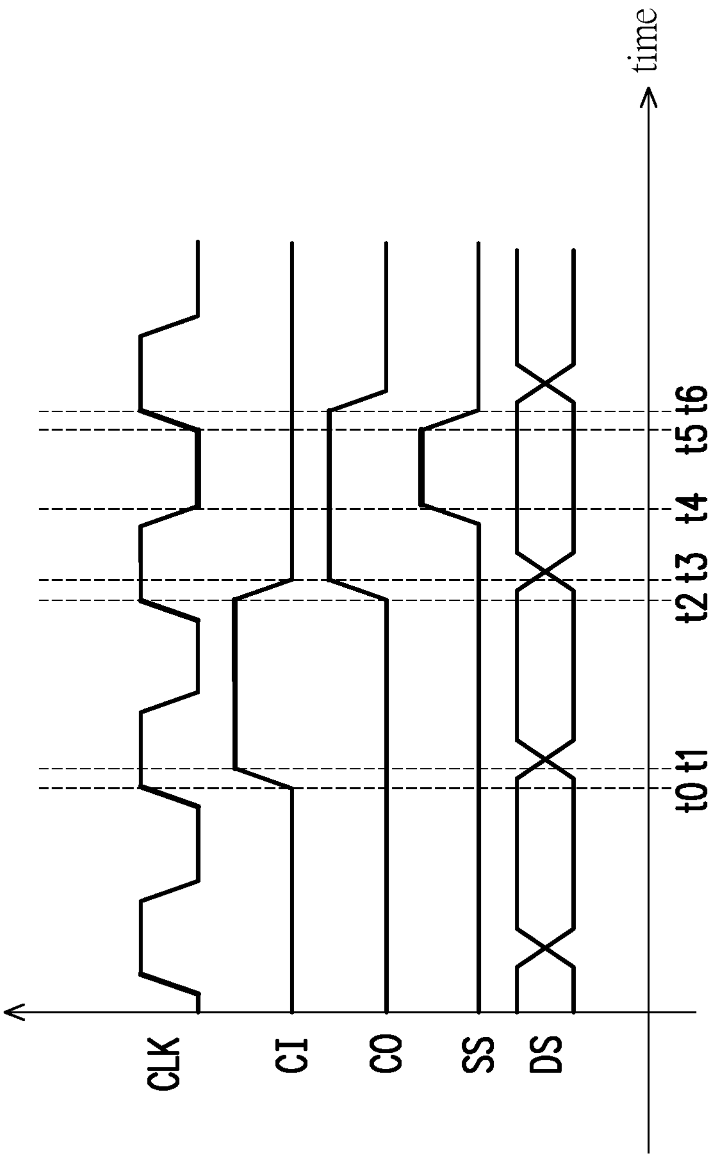
FIG. 4 is a timing diagram of related voltages and signals according to the embodiment of FIG. 3A of the disclosure.

FIG. 4 is a timing diagram of related voltages and signals according to the embodiment of FIG. 3A of the disclosure. Referring to FIGS. 3A and 4, the related voltages and signals in FIG. 4 may be applied to the driving circuit 310 of FIG. 3A when the driving circuit 310 intends to drive the tunable device 320. The clock control terminal of the flip-flop circuit 3111 may receive the clock signal CLK through the clock control terminal P_CLK. During a period from time t1 to time t2, the data input terminal (D) of the flip-flop circuit 3111 may receive the cascade input signal CI (i.e. the start pulse signal form pervious stage) through the carry-in terminal P_CI. The cascade input signal CI changes from a low voltage level to a high voltage level during a period from t0 to time t1, and keeps the high voltage level during the period from time t1 to time t2. Then, during a period from time t3 to time t6, the data output terminal (Q) of the flip-flop circuit 3111 may output a cascade output signal CO (i.e. the start pulse signal for next stage) through the carry-out terminal P_CO. The cascade output signal CO changes from the low voltage level to the high voltage level during the period from time t2 to time t3, and keeps the high voltage during the period from time t3 to time t6 (i.e. starting from the next timing cycle). That is, during a period from time t4 to time t5, the scan signal SS keeps the high voltage level, so that the transistor T1 of the bias circuit 312 is turned-on. Thus, during the period from time t4 to time t5, the transistor T1 may output a corresponding control signal (i.e. a corresponding data voltage) to the driving terminal P_dv to drive the tunable device 320 according to the data signal DS, and, during a period after time t6, the transistor T3 may output the control signal, corresponding to the data voltage held by the capacitor C.

Figure 5:
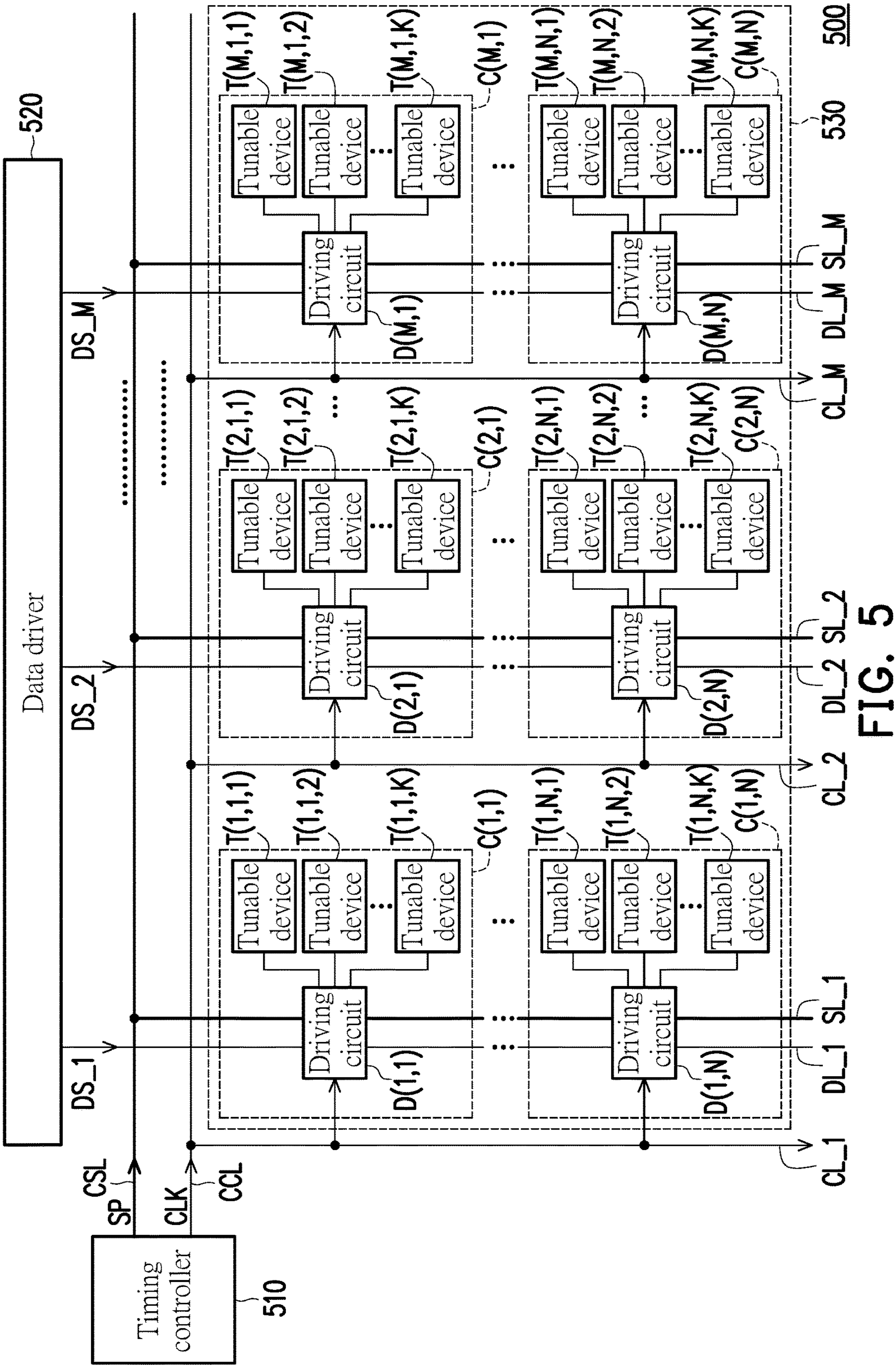
FIG. 5 is a schematic diagram of an electronic apparatus according to an embodiment of the disclosure.

FIG. 5 is a schematic diagram of an electronic apparatus according to an embodiment of the disclosure. Referring to FIG. 5, the electronic apparatus 500 includes a timing controller 510, a data driver 520 and a cascaded module 530. The cascaded module 530 includes a plurality of sets of cascaded units C(1,1) to C(M,N). The timing controller 510 is electrically connected to the sets of cascaded units C(1,1) to C(M,N) through a common start pulse signal line CSL and a common clock signal line CCL, and is configured to provide a start pulse signal SP and a clock signal CLK through the common start pulse signal line CSL and the common clock signal line CCL. Each set of the cascaded units C(1,1) to C(M,N) is electrically connected to the common start pulse signal line CSL through the same branch signal line (i.e. the start pulse signal lines SL_1 to SL_M), and is electrically connected to the common clock signal line CCL through the another same branch signal line (i.e. the clock signal lines CL_1 to CL_M). The data driver 520 is electrically connected to the sets of cascaded units C(1,1) to C(M,N) through a plurality of common data lines DL_1 to DL_M, and is configured to provide a plurality of data signal DS_1 to DS_M. The each set of the cascaded units C(1,1) to C(M,N) is electrically connected to the same common data line.

In the embodiment of the disclosure, the cascaded units C(1,1) to C(M,N) includes a plurality of driving circuits D(1,1) to D(M,N) and a plurality of tunable devices T(1,1,1) to T(M,N,K) and, the driving circuits D(1,1) to D(M,N) is configured to drive the tunable devices T(1,1,1) to T(M,N, K). Each one cascaded unit includes one driving circuit and multiple tunable devices, but the disclosure is not limited thereto. In the embodiment of the disclosure, each one of the driving circuits D(1,1) to D(M,N) is configured to receive the start pulse signal SP and the clock signal CLK through the common start pulse signal line CSL and the common clock signal line CCL, and is configured to receive the corresponding data signal through the corresponding common data line. Each one of the driving circuits D(1,1) to D(M,N) is further configured to output a plurality of scan signals to the corresponding tunable devices according to the start pulse signal SP, the clock signal CLK and the corresponding data signal. In the embodiment of the disclosure, the cascaded units of the each set of cascaded units C(1,1) to C(M,N) form a cascaded circuit.

Figure 6:
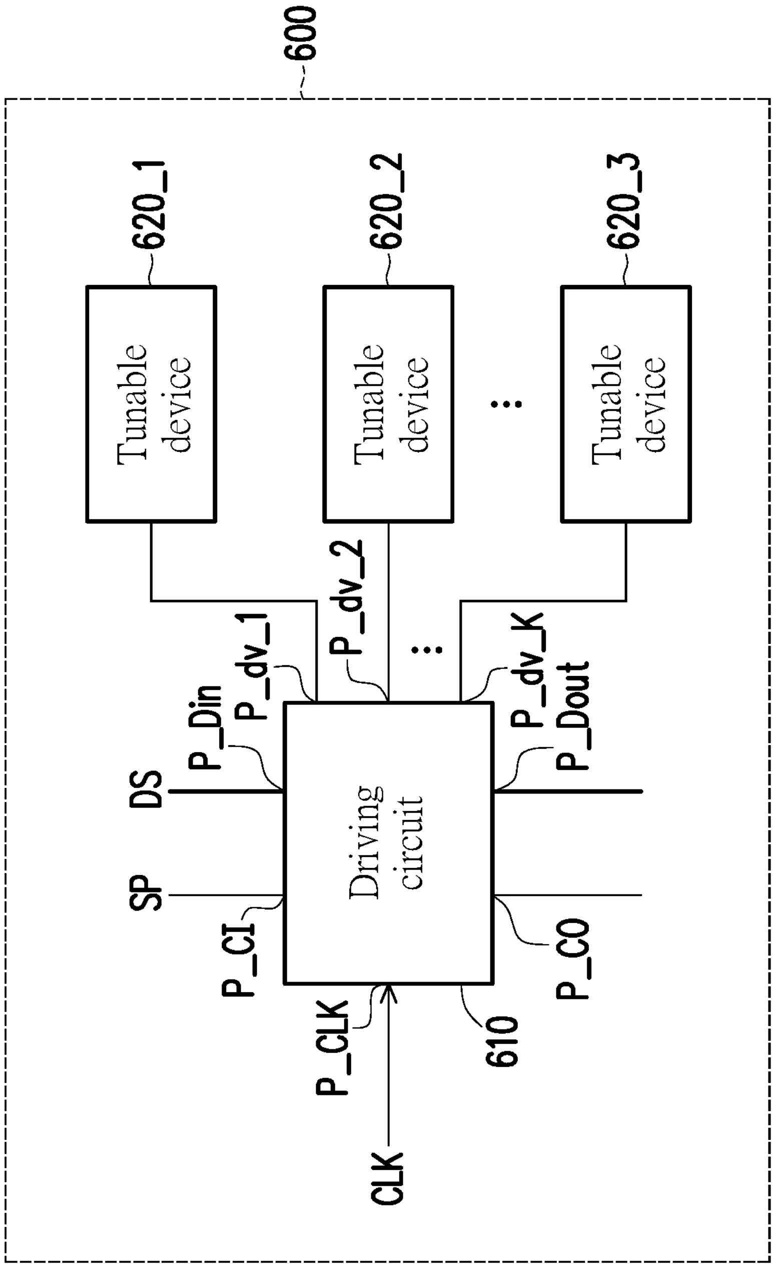
FIG. 6 is a schematic diagram of a cascaded unit according to the embodiment of FIG. 5 of the disclosure.

FIG. 6 is a schematic diagram of a cascaded unit according to the embodiment of FIG. 5 of the disclosure. Referring to FIG. 6, each one of the cascaded units C(1,1) to C(M,N) of FIG. 5 may be implemented in the same way as the cascaded unit 600 of FIG. 6. In the embodiment of the disclosure, the cascaded unit 600 includes a driving circuit 610 and a plurality of tunable devices 620_1 to 620_K, where K is a positive integer. The tunable devices 620_1 to 620_K are electrically connected to the driving circuit 610, and driven by the driving circuit 610. The driving circuit 610 may include a carry-in terminal P_CI, a carry-out terminal P_CO, a clock control terminal P_CLK, a data input terminal P_Din, a data output terminal P_Dout and a plurality of driving terminal P_dv_1 to P_dv_K.

The clock control terminal P_CLK of the driving circuit 610 is electrically connected to the common clock signal line to receive the clock signal CLK. If the cascaded unit 600 is a first stage, the carry-in terminal P_CI of the driving circuit 610 is electrically connected to the common start pulse signal line to receive the start pulse signal SP, and the carry-out terminal P_CO of the driving circuit 610 is electrically connected to the carry-in terminal of the cascaded unit of the next stage to output the start pulse signal SP (i.e. a cascade output signal for use in the next stage as a cascade input signal). If the cascaded unit 600 is not the first stage, the carry-in terminal P_CI of the driving circuit 610 is electrically connected to the carry-out terminal of the cascaded unit of the previous stage to receive the start pulse signal SP (i.e. the cascade input signal, and taken from the cascade output signal of the previous stage), and the carry-out terminal P_CO of the driving circuit 610 is electrically connected to the carry-in terminal of the cascaded unit of the next stage to output the start pulse signal SP (i.e. another cascade output signal for use in the next stage as the cascade input signal).

If the cascaded unit 600 is the first stage, the data input terminal P_Din of the driving circuit 610 is electrically connected to the common data line to receive the data signal DS, and the data output terminal P_Dout of the driving circuit 610 is electrically connected to the data input terminal of the driving circuit of the next stage to output the data signal DS. If the cascaded unit 600 is not the first stage, the data input terminal P_Din of the driving circuit 610 is electrically connected to the data output terminal of the driving circuit of the pervious stage to receive the data signal DS, and the data output terminal P_Dout of the driving circuit 610 is electrically connected to the data input terminal of the driving circuit of the next stage to output the data signal DS.

The driving terminals P_dv_1 to P_dv_K of the driving circuit 610 are electrically connected to the tunable devices 620_1 to 620_K, and is configured to output a plurality of control signals to the tunable devices 620_1 to 620_K according to the clock signal CLK, the start pulse signal SP and the data signal DS, so as to drive the tunable devices 620_1 to 620_K by the control signals. In the embodiment of the disclosure, the specific circuit architecture of the driving circuit 610 may be implemented in the same way as the driving circuit 310 of FIG. 3A, but the disclosure is not limited thereto.

Figure 7:
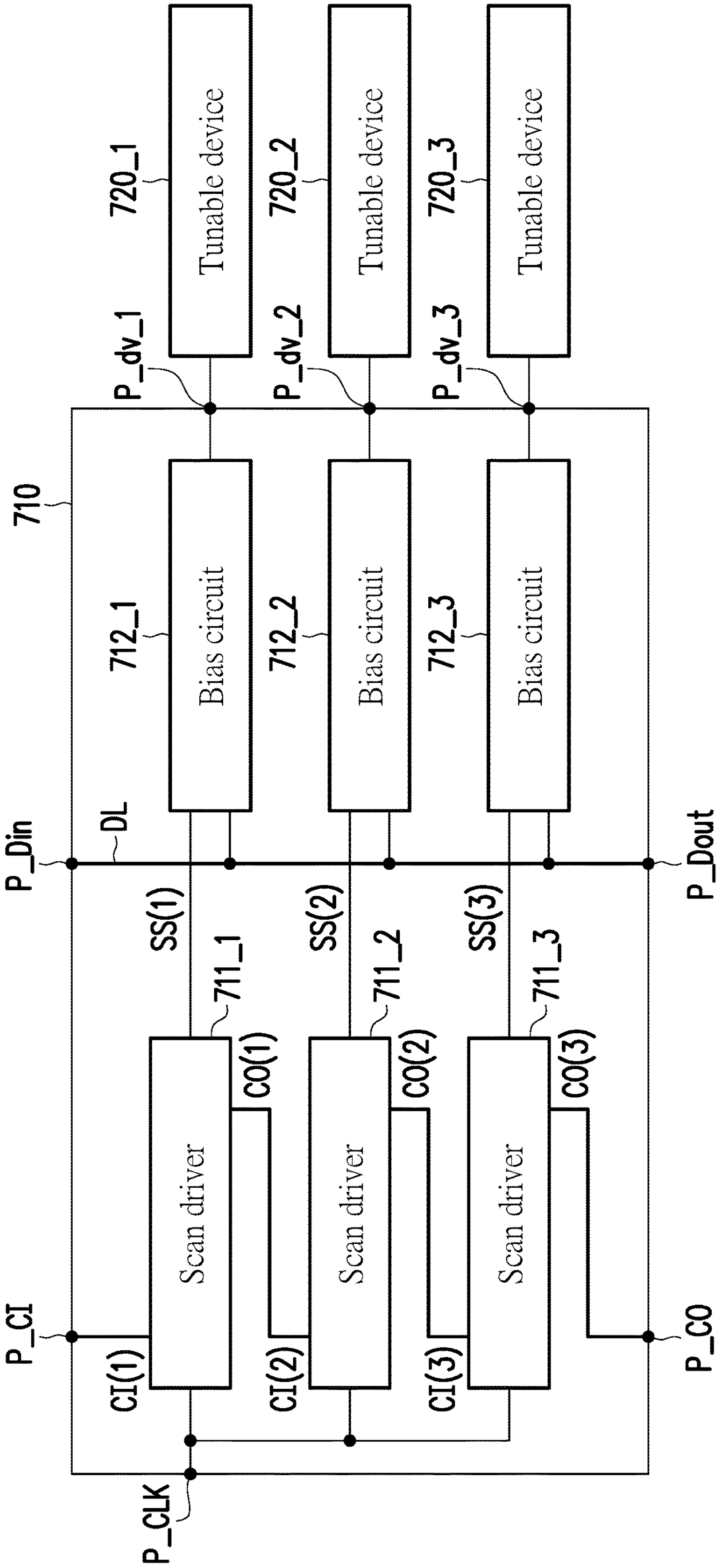
FIG. 7 is a schematic diagram of a cascaded unit according to another embodiment of FIG. 1 of the disclosure.

FIG. 7 is a schematic diagram of a cascaded unit according to another embodiment of FIG. 5 of the disclosure. Referring to FIG. 6 and FIG. 7, in one embodiment of the disclosure, the driving circuit 610 of FIG. 6 may be implemented in the same way as the driving circuit 710 of FIG. 7, and the following description takes one driving circuit driving three tunable devices as an example. In the embodiment of the disclosure, the driving circuit 710 includes three scan drivers 711_1 to 711_3 and three bias circuits 712_1 to 712_3. The specific circuit architecture of each one of the scan drivers 711_1 to 7113 may be implemented in the same way as the scan driver 311 of FIG. 3A, and the specific circuit architecture of each one of the bias circuits 712_1 to 712_3 may be implemented in the same way as the bias circuit 312 of FIG. 3A, the bias circuit 312' of FIG. 3B or the bias circuit 312" of FIG. 3C. The bias circuits 712_1 to 712_3 are electrically connected to the common data line DL between the data input terminal P_Din and the data output terminal P_Dout. The scan drivers 711_1 to 711_3 may form a shift register circuit.

The scan driver 711_1 is electrically connected to the clock control terminal P_CLK to receive the clock signal, and is electrically connected to the carry-in terminal P_CI of the driving circuit 710 to receive a cascade input signal CI(1) (i.e. the start pulse signal). The scan driver 711_1 is further electrically connected to the scan driver 711_2, and outputs a cascade output signal CO(1) to the scan driver 711_2 according to the cascade input signal CI(1). The scan driver 711_1 is configured to generate and output a scan signal SS(1) to the bias circuit 712_1 according to the clock signal and the cascade output signal CO(1).

The scan driver 711_2 is electrically connected to the clock control terminal P_CLK to receive the clock signal, and is electrically connected to the scan driver 711_1 to receive a cascade input signal CI(2) (i.e. the cascade output signal CO(1)). The scan driver 711_2 is further electrically connected to the scan driver 711_3, and outputs a cascade output signal CO(2) to the scan driver 711_3 according to the cascade input signal CI(2). The scan driver 711_2 is configured to generate and output a scan signal SS(2) to the bias circuit 712_2 according to the clock signal and the cascade output signal CO(2).

The scan driver 711_3 is electrically connected to the clock control terminal P_CLK to receive the clock signal, and is electrically connected to the scan driver 711_2 to receive a cascade input signal CI(3) (i.e. the cascade output signal CO(2)). The scan driver 711_3 is further electrically connected to the carry-out terminal P_CO of the driving circuit 710 to output a cascade output signal CI(3) according to the cascade input signal CI(3). The scan driver 711_3 is configured to generate and output a scan signal SS(3) to the bias circuit 712_3 according to the clock signal and the cascade output signal CO(3).

The bias circuit 712_1 is further electrically connected to the tunable device 720_1 through the driving terminal P_dv_1, and drives the tunable device 720_1. The bias circuit 712_1 is configured to output the corresponding control signal to the tunable device 720_1 according to the scan signal SS(1) and the data signal transmitted by the common data line DL.

The bias circuit 712_2 is further electrically connected to the tunable device 720_2 through the driving terminal P_dv_2, and drives the tunable device 720_2. The bias circuit 712_2 is configured to output the corresponding control signal to the tunable device 720_2 according to the scan signal SS(2) and the data signal transmitted by the common data line DL.

The bias circuit 712_3 is further electrically connected to the tunable device 720_3 through the driving terminal P_dv_3, and drives the tunable device 720_3. The bias circuit 712_3 is configured to output the corresponding control signal to the tunable device 720_3 according to the scan signal SS(3) and the data signal transmitted by the common data line DL.

Figure 8:
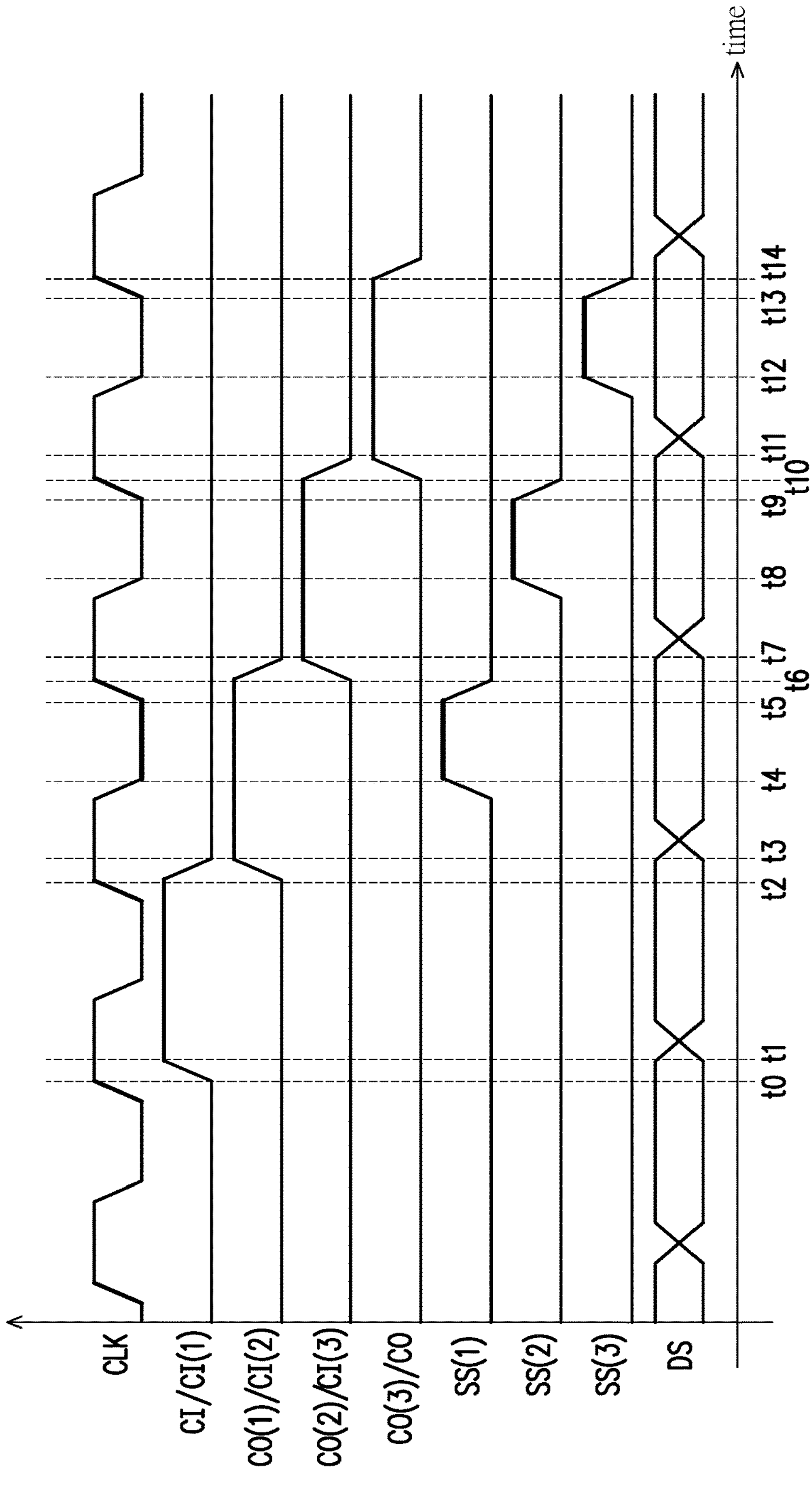
FIG. 8 is a timing diagram of related voltages and signals according to the embodiment of FIG. 7 of the disclosure.

FIG. 8 is a timing diagram of related voltages and signals according to the embodiment of FIG. 7 of the disclosure. Referring to FIGS. 7 and 8, the related voltages and signals in FIG. 8 may be applied to the driving circuit 710 of FIG. 7 when driving circuit 710 intends to drive the tunable devices 720_1 to 720_3. The driving circuit 710 may receive the clock signal CLK through the clock control terminal P_CLK. During a period from time t1 to time t2, the scan driver 711_1 may receive the cascade input signal CI(1) through the carry-in terminal P_CI. The cascade input signal CI(1) changes from a low voltage level to a high voltage level during a period from time t0 to time t1, and keeps the high voltage level during the period from time t1 to time t2. Then, during a period from time t3 to time t6, the scan driver 711_1 may output the cascade output signal CO(1) to the scan driver 711_2. The cascade output signal CO(1) changes from the low voltage level to the high voltage level during the period from time t2 to time t3, and keeps the high voltage level during the period from time t3 to time t6 (i.e. starting from the next timing cycle). That is, during the period from time t4 to time t5, the scan signal SS(1) keeps the high voltage level, so that the bias circuit 7121 may output a corresponding control signal to the driving terminal P_dv_1 to drive the tunable device 720_1 according to the data signal DS, and then, during a period after time t5, the bias circuit 7121 may continue to output the control signal.

During the period from time t3 to time t6, the scan driver 711_2 may receive the cascade input signal CI(2) from the scan driver 711_1. The cascade input signal CI(2) changes from a low voltage level to a high voltage level during to the period from time t2 to time t3, and keeps the high voltage level during the period from time t3 to time t6. Then, during a period from time t7 to time t10, the scan driver 711_2 may output the cascade output signal CO(2) to the scan driver 711_3. The cascade output signal CO(2) changes from the low voltage level to the high voltage level during the period from time t6 to time t7, and keeps the high voltage level during the period from time t7 to time t10. That is, during a period from time t8 to time t9, the scan signal SS(2) keeps the high voltage level, so that the bias circuit 7122 may output a corresponding control signal to the driving terminal P_dv_2 to drive the tunable device 720_2 according to the data signal DS, and then, during a period after time t9, the bias circuit 7122 may continue to output the control signal.

During the period from time t7 to time t10, the scan driver 711_3 may receive the cascade input signal CI(3) from the scan driver 711_2. The cascade input signal CI(3) changes from a low voltage level to a high voltage level during the period from time t7 to time t10. Then, during a period from time t11 to time t14, the scan driver 711_3 may output the cascade output signal CO(3). The cascade output signal CO(3) changes from the low voltage level to the high voltage level during the period from time t10 to time t11, and keeps the high voltage level during the period from time t11 to time t14. That is, during a period from time t12 to time t13, the scan signal SS(3) keeps the high voltage level, so that the bias circuit 7123 may output a corresponding control signal to the driving terminal P_dv_3 to drive the tunable device 720_3 according to the data signal DS, and then, during a period after time t13, the bias circuit 7123 may continue to output the control signal.

Figure 9A:
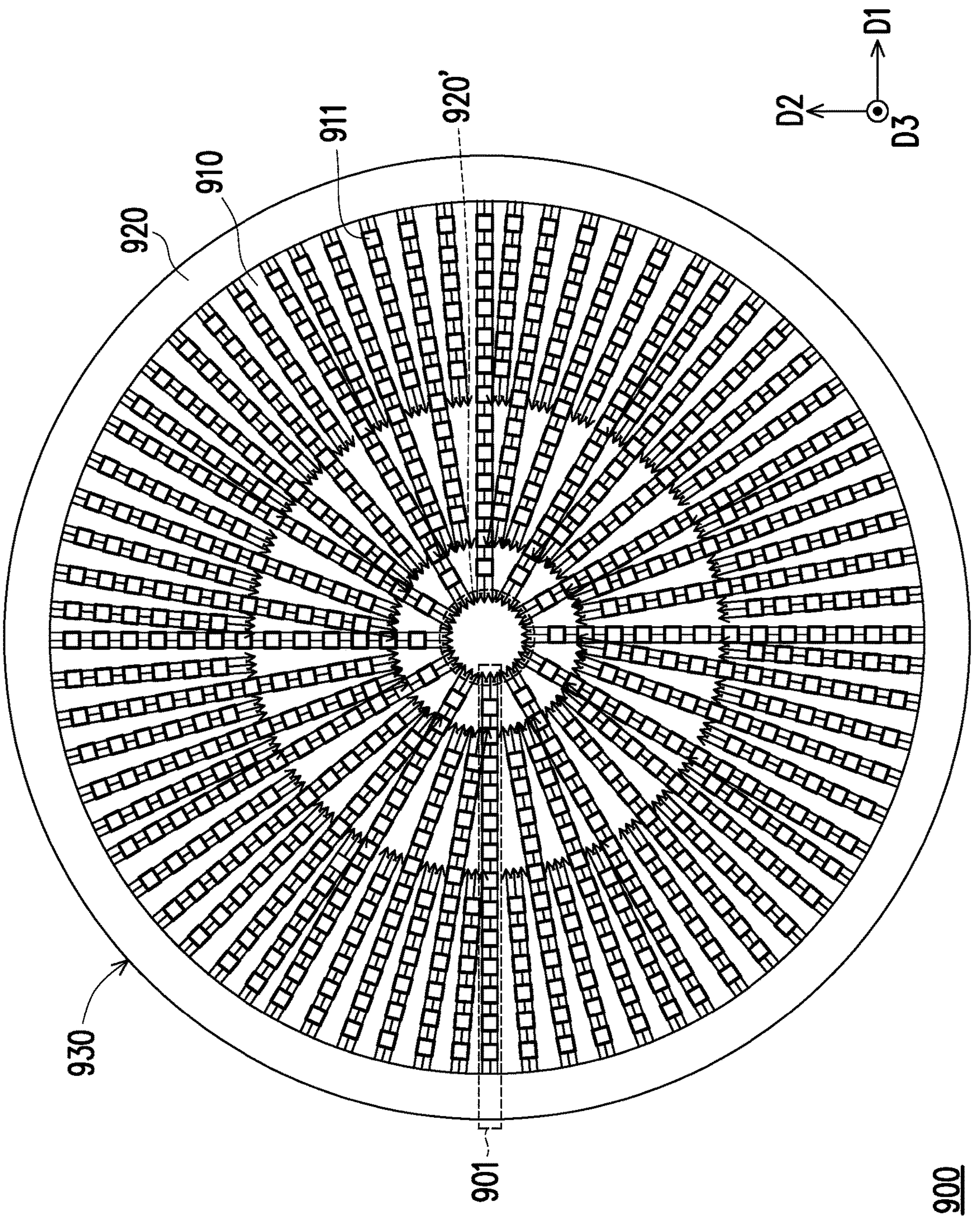
FIG. 9A is a schematic diagram of an electronic apparatus according to an embodiment of the disclosure.

FIG. 9A is a schematic diagram of an electronic apparatus according to an embodiment of the disclosure. Referring to FIG. 9A, the layout of the electronic apparatus of each embodiment of the disclosure may be implemented in the same way as the electronic apparatus 900 of FIG. 9A. In the embodiment of the disclosure, the electronic apparatus 900 may include a plurality of sets of cascaded units 911 arranged in an area 910 (e.g. an active area) of a plane of a substrate 930. The plane of the substrate 930 extends along the direction D1 and the direction D2. If the electronic apparatus 900 is a beam-steerable directional antenna, the electronic apparatus 900 may receive from and/or transmit towards a direction D3. The directions D1 to D3 are perpendicular to each other. The substrate 930 may be a circular substrate, and the area 910 may also be circular or annular, but the disclosure is not limited thereto. In the embodiment of the disclosure, each one of the plurality of sets of cascaded units 911 is arranged in a line, and the plurality of sets of cascaded units 911 are arranged in a plurality of radial lines. Moreover, the electronic apparatus 900 may further include a timing controller and a data driver. In the embodiment of the disclosure, the timing controller and the data driver may be arranged in an area 920 (e.g. a peripheral area) of the substrate 930, and the area 920 surrounds the area 910. The area 920 may also be annular. However, in one embodiment of the disclosure, the timing controller and the data driver may also be arranged in an area 920' of the substrate 930, and the area 910 surrounds the area 920'. The area 920' may also be circular.

Figure 9B:
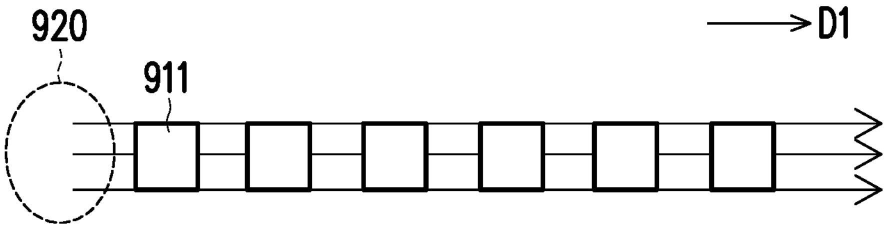
FIG. 9B is a schematic diagram of a configuration relationship between the cascaded unit and the data driver according to the embodiment of FIG. 9A of the disclosure.

FIG. 9B is a schematic diagram of a configuration relationship between the cascaded unit and the data driver according to the embodiment of FIG. 9A of the disclosure. Referring to FIGS. 9A and 9B, taking one cascaded unit set 901 in FIG. 9A as an example. In the embodiment of the disclosure, the timing controller and the data driver of the electronic apparatus 900 may be arranged in the area 920. Thus, the timing controller and the data driver may be electrically connected to the cascaded units 911 of the cascaded unit set 901 along the direction D1 through a common clock signal line, a common data line and a common start pulse signal line, and the cascaded units 911 of the cascaded unit set 901 may be sequentially driven along the direction D1. That is, the scan order of the cascaded units 911 of the cascaded unit set 901 may be from the outside to the center in the area 910.

Figure 9C:
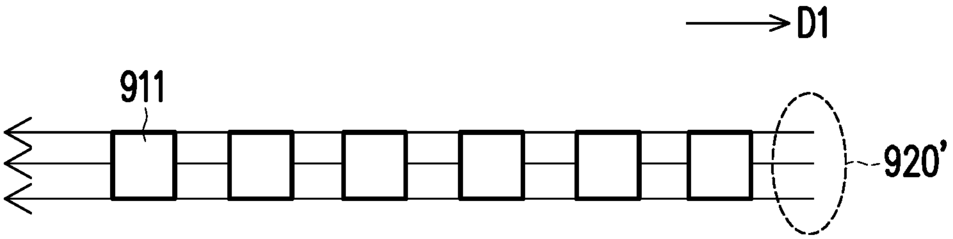
FIG. 9C is a schematic diagram of a configuration relationship between the cascaded unit and the data driver according to another embodiment of FIG. 9A of the disclosure.

FIG. 9C is a schematic diagram of a configuration relationship between the cascaded unit and the data driver according to another embodiment of FIG. 9A of the disclosure. Referring to FIGS. 9A and 9C, taking one cascaded unit set 901 in FIG. 9A as an example. In the embodiment of the disclosure, the timing controller and the data driver of the electronic apparatus 900 may be arranged in the area 920'. Thus, the timing controller and the data driver may be electrically connected to the cascaded units 911 of the cascaded unit set 901 along a direction opposite to the direction D1 through a common clock signal line, a common data line and a common start pulse signal line, and the cascaded units 911 of the cascaded unit set 901 may be sequentially driven along the direction opposite to the direction D1. That is, the scan order of the cascaded units 911 of the cascaded unit set 901 may be from the center to the outside in the area 910.

Figure 9D:
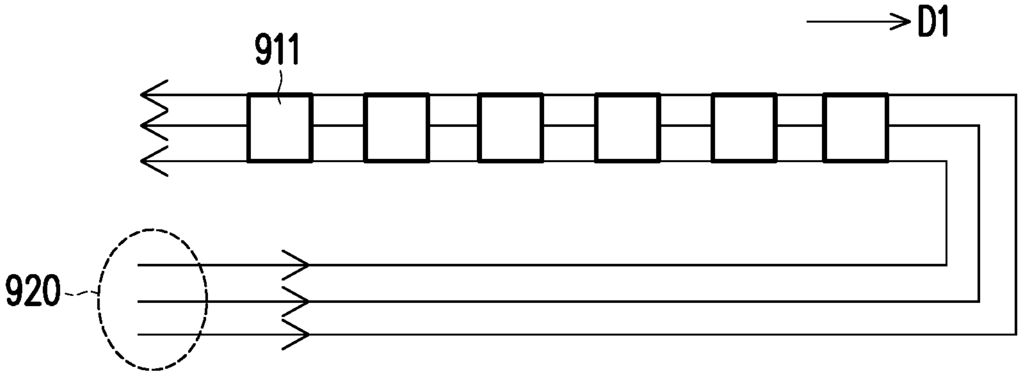
FIG. 9D is a schematic diagram of a configuration relationship between the cascaded unit and the data driver according to another embodiment of FIG. 9A of the disclosure.

FIG. 9D is a schematic diagram of a configuration relationship between the cascaded unit and the data driver according to another embodiment of FIG. 9A of the disclosure. Referring to FIGS. 9A and 9D, taking one cascaded unit set 901 in FIG. 9A as an example. In the embodiment of the disclosure, the timing controller and the data driver of the electronic apparatus 900 may be arranged in the area 920. Thus, the timing controller and the data driver may be electrically connected to the cascaded units 911 of the cascaded unit set 901 along an U-turn path through a common clock signal line, a common data line and a common start pulse signal line, and the cascaded units 911 of the cascaded unit set 901 may be sequentially driven along a direction opposite to the direction D1. That is, the scan order of the cascaded units 911 of the cascaded unit set 901 may be from the center to the outside in the area 910.

Figure 10A:
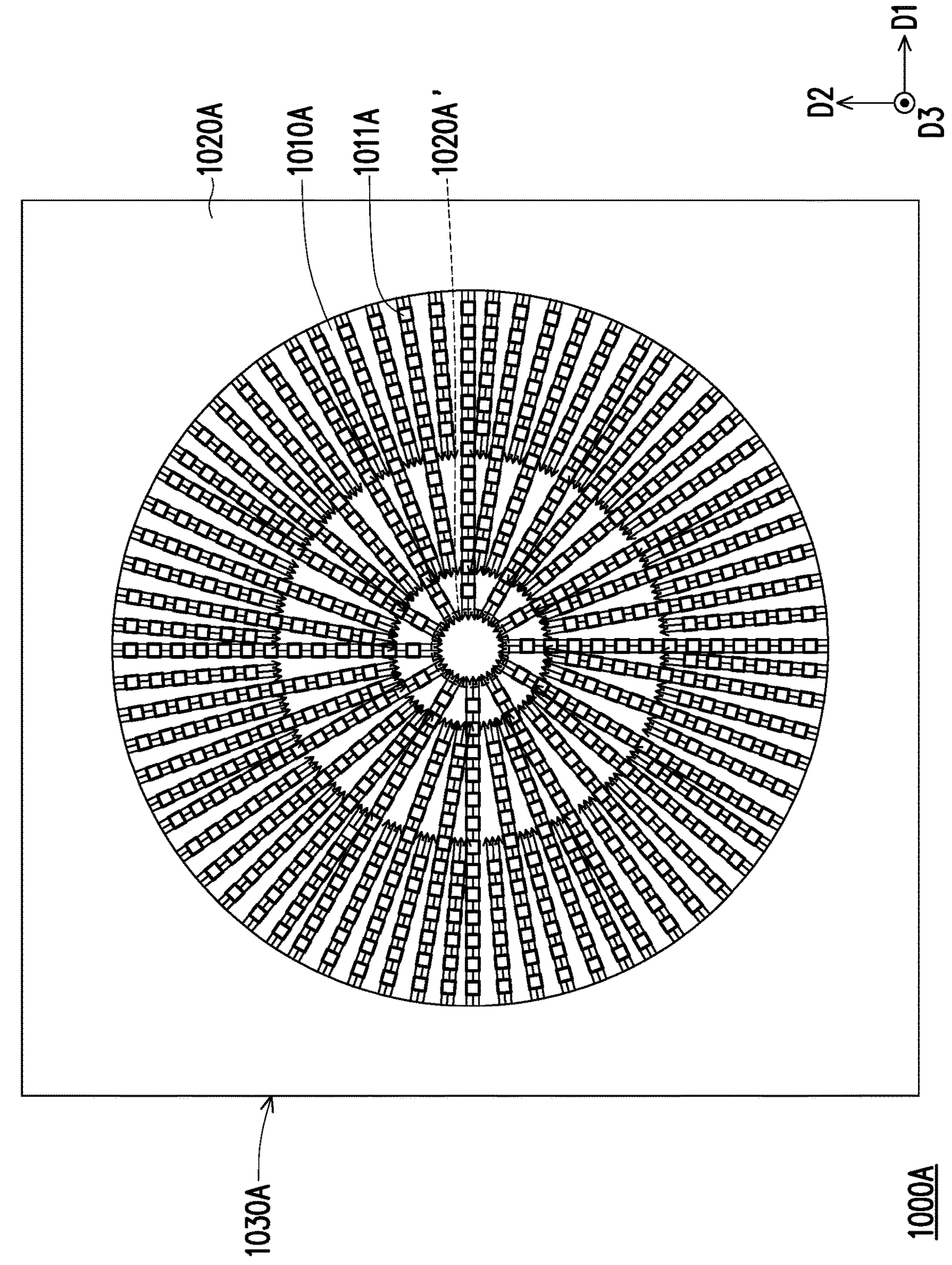
FIG. 10A is a schematic diagram of an electronic apparatus according to another embodiment of the disclosure.

FIG. 10A is a schematic diagram of an electronic apparatus according to another embodiment of the disclosure. Referring to FIG. 10A, the layout of the electronic apparatus of each embodiment of the disclosure may be implemented in the same way as the electronic apparatus 1000A of FIG. 10A. In the embodiment of the disclosure, the electronic apparatus 1000A may include a plurality of sets of cascaded units 1011A arranged in an area 1010A (e.g. an active area) of a plane of a substrate 1030A. The plane of the substrate 1030A extends along the direction D1 and the direction D2. If the electronic apparatus 1000A is a beam-steerable directional antenna, the electronic apparatus 1000A may receive from and/or transmit towards the direction D3. The substrate 1030A may be a rectangle substrate, and the area 1010A may be circular or annular, but the disclosure is not limited thereto. In the embodiment of the disclosure, each one of the plurality of sets of cascaded units 1011A is arranged in a line, and the plurality of sets of cascaded units 1011A are arranged in a plurality of radial lines. Moreover, the electronic apparatus 1000A may further include a timing controller and a data driver. In the embodiment of the disclosure, the timing controller and the data driver may be arranged in an area 1020A of the substrate 1030A, and the area 1020A surrounds the area 1010A. However, in one embodiment of the disclosure, the timing controller and the data driver may also be arranged in an area 1020A' of the substrate 1030A, and the area 1010A surrounds the area 1020A'. The area 1020A' may also be circular.

Figure 10B:
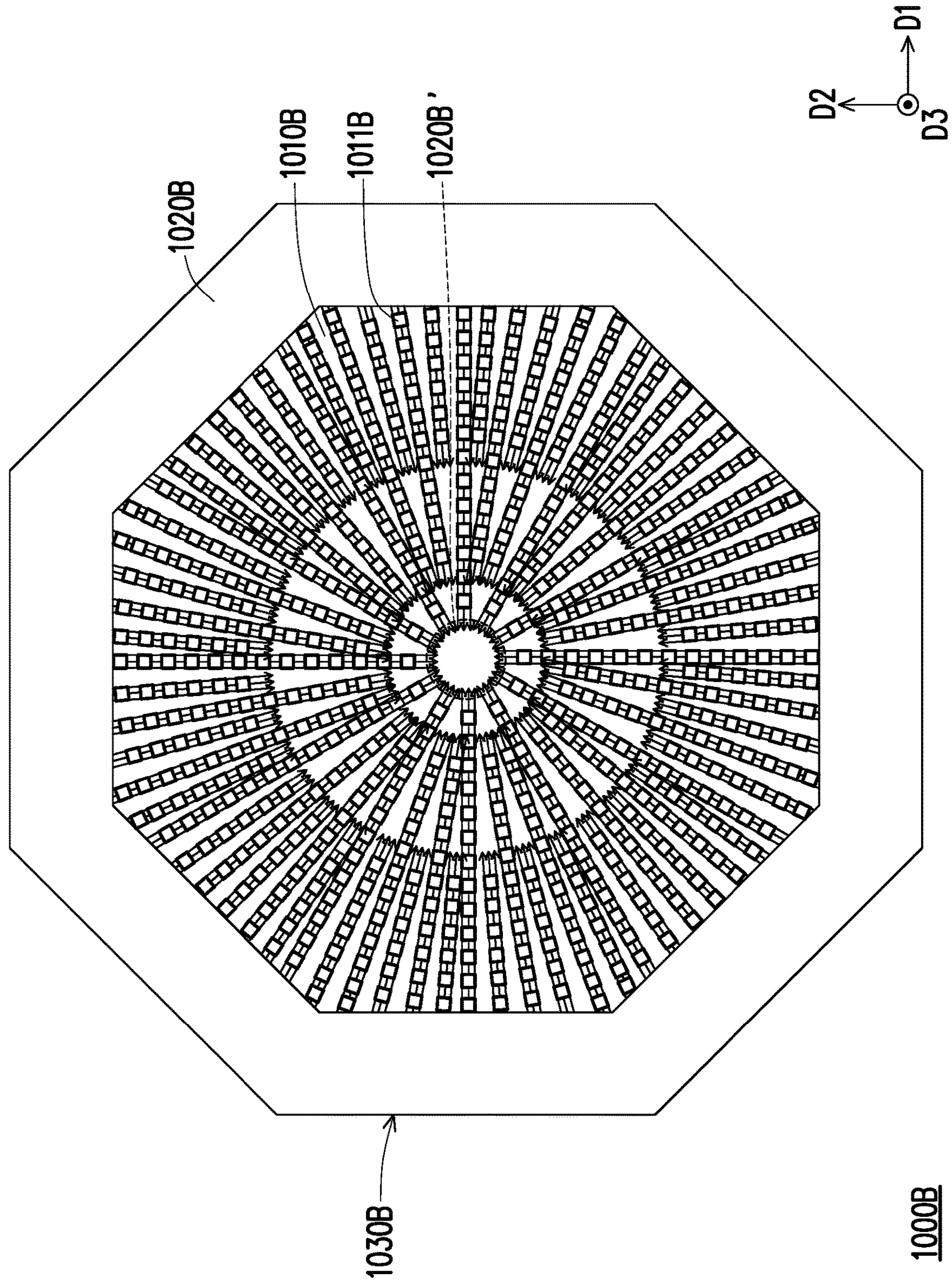
FIG. 10B is a schematic diagram of an electronic apparatus according to another embodiment of the disclosure.

FIG. 10B is a schematic diagram of an electronic apparatus according to another embodiment of the disclosure. Referring to FIG. 10B, the layout of the electronic apparatus of each embodiment of the disclosure may be implemented in the same way as the electronic apparatus 1000B of FIG. 10B. In the embodiment of the disclosure, the electronic apparatus 1000B may include a plurality of sets of cascaded units 1011B arranged in an area 1010B (e.g. an active area) of a plane of a substrate 1030B. The plane of the substrate 1030B extends along the direction D1 and the direction D2. If the electronic apparatus 1000B is a beam-steerable directional antenna, the electronic apparatus 1000B may receive from and/or transmit towards the direction D3. The substrate 1030B may be an octagonal (or polygonal) substrate, and the area 1010B may also be octagonal, but the disclosure is not limited thereto. In the embodiment of the disclosure, each one of the plurality of sets of cascaded units 1011B is arranged in a line, and the plurality of sets of cascaded units 1011B are arranged in a plurality of radial lines. Moreover, the electronic apparatus 1000B may further include a timing controller and a data driver. In the embodiment of the disclosure, the timing controller and the data driver may be arranged in an area 1020B of the substrate 1030B, and the area 1020B surrounds the area 1010B. However, in one embodiment of the disclosure, the timing controller and the data driver may also be arranged in an area 1020B' of the substrate 1030B, and the area 1010B surrounds the area 1020B'. The area 1020B' may be circular.

Figure 11A:
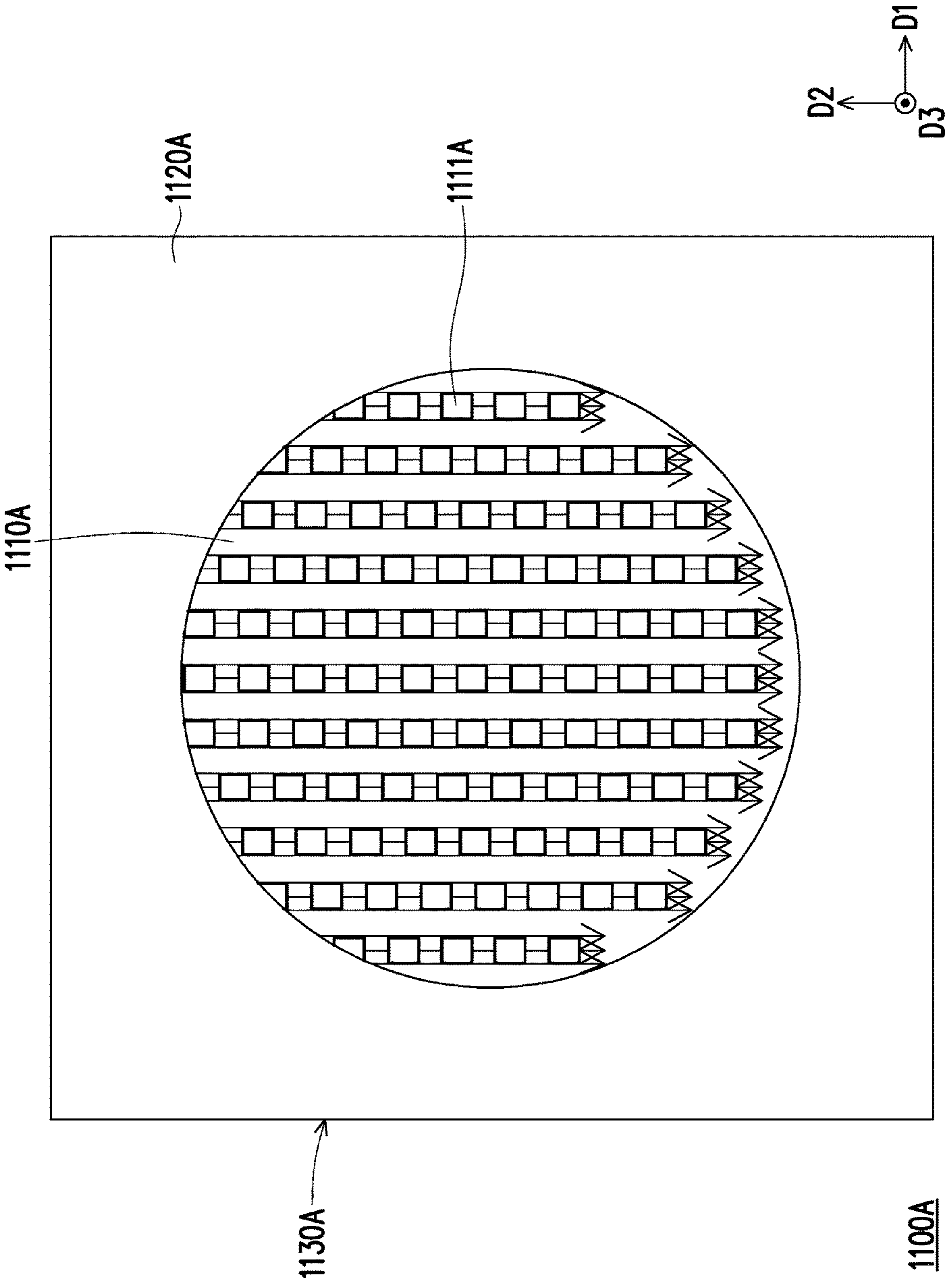
FIG. 11A is a schematic diagram of an electronic apparatus according to another embodiment of the disclosure.

FIG. 11A is a schematic diagram of an electronic apparatus according to another embodiment of the disclosure. Referring to FIG. 11A, the layout of the electronic apparatus of each embodiment of the disclosure may be implemented in the same way as the electronic apparatus 1100A of FIG. 11A. In the embodiment of the disclosure, the electronic apparatus 1100A may include a plurality of sets of cascaded units 1111A arranged in an area 1110A (e.g. an active area) of a plane of a substrate 1130A. The plane of the substrate 1130A extends along the direction D1 and the direction D2. If the electronic apparatus 1100A is a beam-steerable directional antenna, the electronic apparatus 1100A may receive from and/or transmit towards the direction D3. The substrate 1130A may be a rectangle substrate, and the area 1110A may be circular, but the disclosure is not limited thereto. In the embodiment of the disclosure, each one of the plurality of sets of cascaded units 1111A is arranged in a line, and the plurality of sets of cascaded units 1111A are arranged along the same direction, but the disclosure is not limited thereto. Moreover, the electronic apparatus 1100A may further include a timing controller and a data driver. The timing controller and the data driver may be arranged in an area 1120A of the substrate 1130A, and the area 1120A surrounds the area 1110A. The timing controller and the data driver may be electrically connected to the plurality of sets of cascaded units 1111A along a direction opposite to the direction D2, and the cascaded units 1111A may be sequentially driven along the direction opposite to the direction D2. In one embodiment of the disclosure, the plurality of sets of cascaded units 1111A may be arranged along other same direction.

Figure 11B:
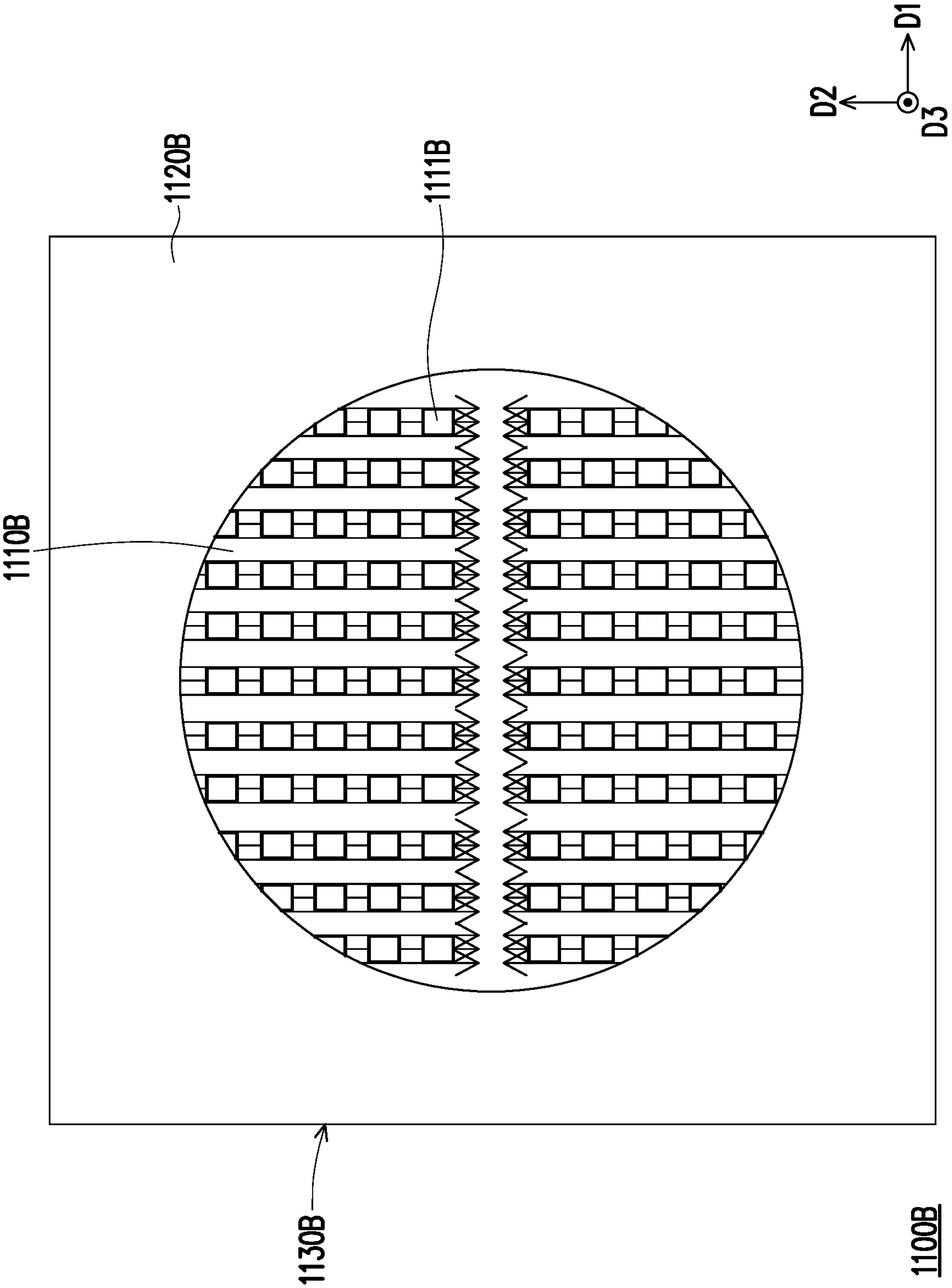
FIG. 11B is a schematic diagram of an electronic apparatus according to another embodiment of the disclosure.

FIG. 11B is a schematic diagram of an electronic apparatus according to another embodiment of the disclosure. Referring to FIG. 11B, the layout of the electronic apparatus of each embodiment of the disclosure may be implemented in the same way as the electronic apparatus 1100B of FIG. 11B. In the embodiment of the disclosure, the electronic apparatus 1100B may include a plurality of sets of cascaded units 1111B arranged in an area 1110B (e.g. an active area) of a plane of a substrate 1130B. The plane of the substrate 1130B extends along the direction D1 and the direction D2. If the electronic apparatus 1100B is a beam-steerable directional antenna, the electronic apparatus 1100B may receive from and/or transmit towards the direction D3. The substrate 1130B may be a rectangle substrate, and the area 1110B may be circular, but the disclosure is not limited thereto. In the embodiment of the disclosure, each one of the plurality of sets of cascaded units 1111B is arranged in a line, and the plurality of sets of cascaded units 1111B are divided into two groups. The two groups of the sets of cascaded units 1111B are arranged along the same direction, but the disclosure is not limited thereto. Moreover, the electronic apparatus 1100B may further include a timing controller and a data driver. The timing controller and the data driver may be arranged in an area 1120B of the substrate 1130B, and the area 1120B surrounds the area 1110B. The timing controller and the data driver may be electrically connected to the two groups of the sets of cascaded units 1111B along the direction D2 and a direction opposite to the direction D2, and the two groups of the sets of cascaded units 1111B may be sequentially driven along the direction D2 and a direction opposite to the direction D2. In one embodiment of the disclosure, the two groups of the sets of cascaded units 1111B may be arranged along other different directions.

Figure 11C:
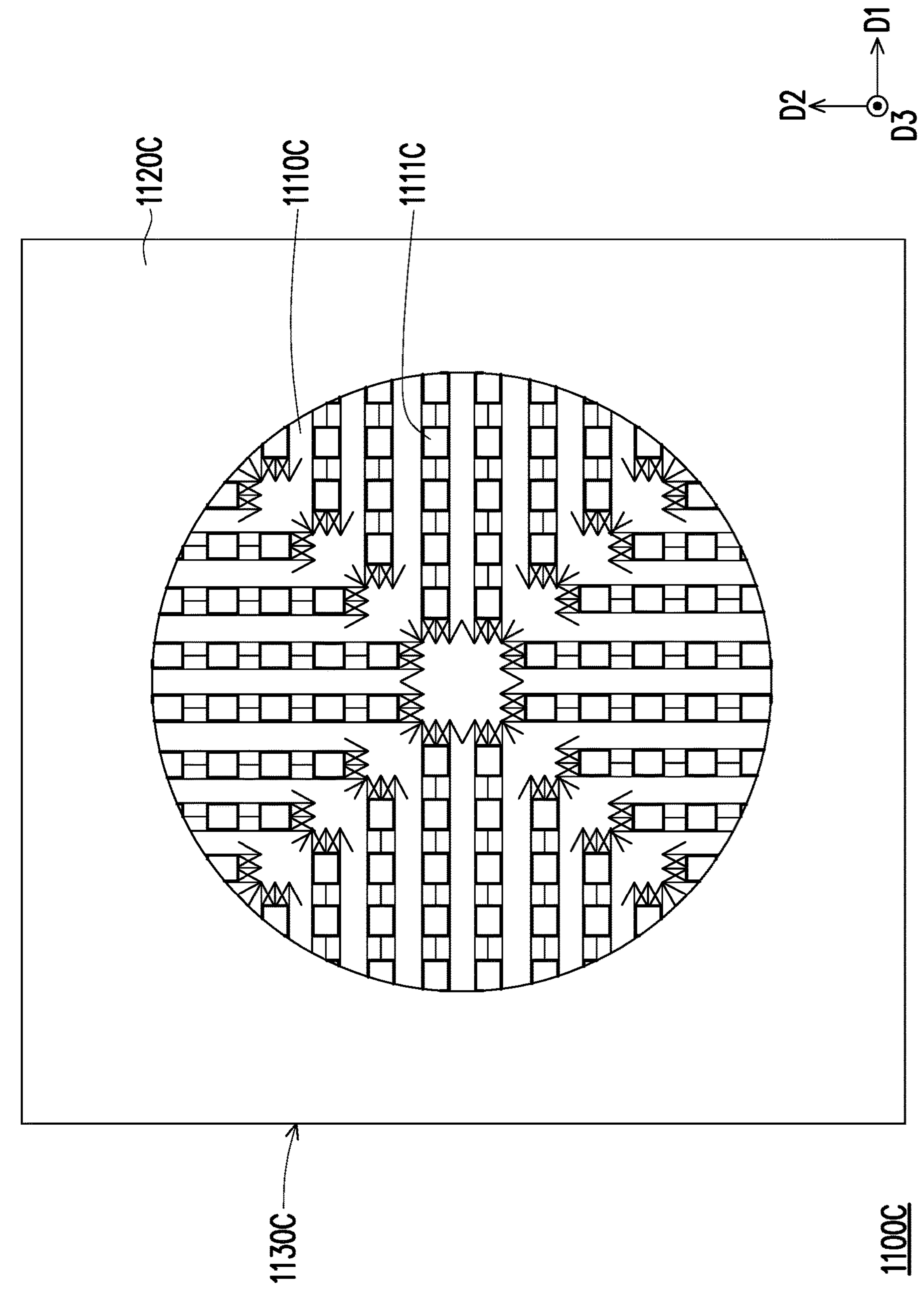
FIG. 11C is a schematic diagram of an electronic apparatus according to another embodiment of the disclosure.

FIG. 11C is a schematic diagram of an electronic apparatus according to another embodiment of the disclosure. Referring to FIG. 11C, the layout of the electronic apparatus of each embodiment of the disclosure may be implemented in the same way as the electronic apparatus 1100C of FIG. 11C. In the embodiment of the disclosure, the electronic apparatus 1100C may include a plurality of sets of cascaded units 1111C arranged in an area 1110C (e.g. an active area) of a plane of a substrate 1130C. The plane of the substrate 1130C extends along the direction D1 and the direction D2. If the electronic apparatus 1100C is a beam-steerable directional antenna, the electronic apparatus 1100C may receive from and/or transmit towards the direction D3. The substrate 1130C may be a rectangle substrate, and the area 1110C may be circular, but the disclosure is not limited thereto. In the embodiment of the disclosure, each one of the plurality of sets of cascaded units 1111C is arranged in a line, and the plurality of sets of cascaded units 1111C are divided into four groups. The four groups of the sets of cascaded units 1111B are arranged along in four orthogonal lines, but the disclosure is not limited thereto. Moreover, the electronic apparatus 1100C may further include a timing controller and a data driver. The timing controller and the data driver may be arranged in an area 1120C of the substrate 1130C, and the area 1120C surrounds the area 1110C. The timing controller and the data driver may be electrically connected to the four groups of the sets of cascaded units 1111C along four orthogonal directions, and the four groups of the sets of cascaded units 1111C may be sequentially driven along the four orthogonal directions.

In summary, the electronic apparatus of the disclosure provides a novel driving circuit architecture, and can implement a driving scheme without scan lines. The electronic apparatus of the disclosure may contribute to the ease of designing (mask layout) the beam-steerable directional antenna based on the Radial Line Slot Antenna (RLSA) architecture with the tunable device such as liquid crystal and varactor. The electronic apparatus of the disclosure may also help to achieve high frame rate operation by reducing the parasitic capacitance and trace resistance of the data line.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An electronic apparatus, comprising:
a plurality of sets of cascaded units,
wherein each one of the plurality of sets of cascaded units is electrically connected to a common data line and a common clock signal line which provides a clock signal, and each one of the plurality of sets of cascaded units forms a cascaded circuit,
wherein each one of the cascaded units comprises:
a driving circuit, comprises at least one scan driver and at least one bias circuit; and
at least one tunable device, electrically connected to the driving circuit, and driven by the driving circuit,
wherein the at least one scan driver is directly connected to a timing controller through the common clock signal line which provides the clock signal,
wherein the at least one bias circuit of each one of the cascaded units is electrically connected to the common data line.

2. The electronic apparatus according to claim 1, wherein at least one scan driver is configured to output a scan signal to at least one bias circuit.

3. The electronic apparatus according to claim 2, wherein at least one scan driver is configured to receive a cascade input signal, and output a cascade output signal.

4. The electronic apparatus according to claim 3, wherein at least one scan driver comprises:
a flip-flop circuit, wherein a data input terminal of the flip-flop circuit is configured to receive the cascade input signal, and a clock control terminal of the flip-flop circuit is configured to receive a clock signal;
an inverter circuit, wherein an input terminal of the inverter circuit is configured to receive the clock signal; and
an AND gate, wherein a first input terminal of the AND gate is electrically connected to a data output terminal of the flip-flop circuit, a second terminal of the AND gate is electrically connected to an output terminal of the inverter circuit, and an output terminal of the AND gate is configured to output the scan signal.

5. The electronic apparatus according to claim 2, wherein at least one bias circuit comprises:
a transistor, configured to receive the scan signal; and a capacitor, electrically connected to the transistor and the common data line through the transistor, and configured to store a data voltage, wherein at least one bias circuit is configured to output a control signal to at least one tunable, corresponding to the data voltage.

6. The electronic apparatus according to claim 5, wherein the transistor and the capacitor constitute a constant voltage source circuit.

7. The electronic apparatus according to claim 6, wherein the constant voltage source circuit comprises a source follower amplifier.

8. The electronic apparatus according to claim 6, wherein the constant voltage source circuit comprises an operational amplifier.

9. The electronic apparatus according to claim 1, wherein the driving circuit is configured to drive at least two tunable devices.

10. The electronic apparatus according to claim 9, wherein the driving circuit comprises at least two scan drivers and at least two bias circuits.

11. The electronic apparatus according to claim 10, wherein at least two scan drivers form a shift register circuit.

12. The electronic apparatus according to claim 1, wherein the driving circuit is a discrete integrated circuit.

13. The electronic apparatus according to claim 1, wherein the driving circuit is a thin film transistor circuit.

14. The electronic apparatus according to claim 1, wherein the cascaded units of each one of the plurality of sets of cascaded units is arranged in a line.

15. The electronic apparatus according to claim 1, wherein the plurality of sets of cascaded units are arranged in a plurality of radial lines.

16. The electronic apparatus according to claim 1, further comprising:

a data driver, disposed in a first area of a substrate, wherein the plurality of sets of cascaded units are disposed in a second area of the substrate, and the first area surrounds the second area.

17. The electronic apparatus according to claim 1, further comprising:

a data driver, disposed in a first area of a substrate, wherein the plurality of sets of cascaded units are disposed in a second area of the substrate, and the second area surrounds the first area.

18. The electronic apparatus according to claim 1, wherein the plurality of sets of cascaded units are arranged in a plurality of orthogonal lines.

* * * * *